United States Patent
Xu et al.

(10) Patent No.: US 7,975,183 B2
(45) Date of Patent: Jul. 5, 2011

(54) DYNAMIC DEBUGGING OF PLATFORM TRANSACTIONS VIA CONTEXT AWARE TRANSACTIONAL DEBUG MARKING

(75) Inventors: Zheng Xu, Austin, TX (US); David P. Lapp, Ottawa (CA)

(73) Assignee: Freescale Semiconductor, Inc., Austin, TX (US)

( * ) Notice: Subject to any disclaimer, the term of this patent is extended or adjusted under 35 U.S.C. 154(b) by 225 days.

(21) Appl. No.: 12/466,777

(22) Filed: May 15, 2009

(65) Prior Publication Data

US 2010/0293416 A1 Nov. 18, 2010

(51) Int. Cl.
G06F 11/00 (2006.01)
(52) U.S. Cl. .......................................... 714/45; 714/46
(58) Field of Classification Search .................... 714/45, 714/46, 47, 37, 38; 712/216, 227
See application file for complete search history.

(56) References Cited

U.S. PATENT DOCUMENTS 6,145,122 A 11/2000 Miller et al.

OTHER PUBLICATIONS

U.S. Appl. No. 12/427,646, filed Apr. 21, 2009.

Primary Examiner — Dieu-Minh Le

(57) ABSTRACT

A system includes a platform domain implementing address-indexed operations and an application domain implementing application context-oriented operations. The platform domain includes a platform interconnect to process address-indexed platform transactions and a trace monitor to generate a debug trace stream from platform transactions based on their platform context information. The application domain includes a processing component and a queue manager to queue descriptors for data frames to be processed by the application domain, each descriptor having application context information including application-specific debug information for the corresponding data frame. The processing component processes a selected data frame by accessing, from the queue manager, a descriptor associated with the selected data frame, translating an application-specific debug information of the descriptor to a corresponding platform attribute value, and providing a platform transaction to the platform interconnect for processing in the platform domain, the platform transaction having the platform attribute value in an attribute field.

20 Claims, 6 Drawing Sheets

DYNAMIC DEBUGGING OF PLATFORM TRANSACTIONS VIA CONTEXT AWARE TRANSACTIONAL DEBUG MARKING

FIELD OF THE DISCLOSURE

The present disclosure relates to data processing and more particularly to debugging in data processing systems.

BACKGROUND

Many processing systems utilize multiple processing cores or other processing components in an effort to increase processing throughput. Communication of data among the processing components of a processing system typically is conducted via address-indexed transactions processed by a platform interconnect. As inter-component communications are conducted via these platform transactions, it typically is advantageous to configure the debugging utilities for performance characterization and parallel multi-core software functional debugging to monitor the platform transactions through the platform interconnect.

In addition to platform-level transactions for communicating between components, a processing system may implement a sub-group of hardware components directed to a specific application, such as a set of hardware accelerators directed to a particular task. To facilitate rapid processing, the components of this sub-group process data in a context-oriented manner. As such, the debugging information generated within this sub-group typically is at a higher application level and therefore difficult to relate to platform level attributes. Typically the address buffers used by the processing components of this sub-group are dynamically allocated and therefore difficult to differentiate for inclusion in a trace stream generated by a platform-level debugging utility, which typically uses the address or platform attribute information of a platform transaction to identify platform transaction information for inclusion in the trace stream. As such, the trace stream is less likely to include meaningful debugging information related to the platform transactions of the components of the application-specific sub-group and therefore will not provide the desired visibility into the performance characterization and operation of this sub-group for debugging purposes.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
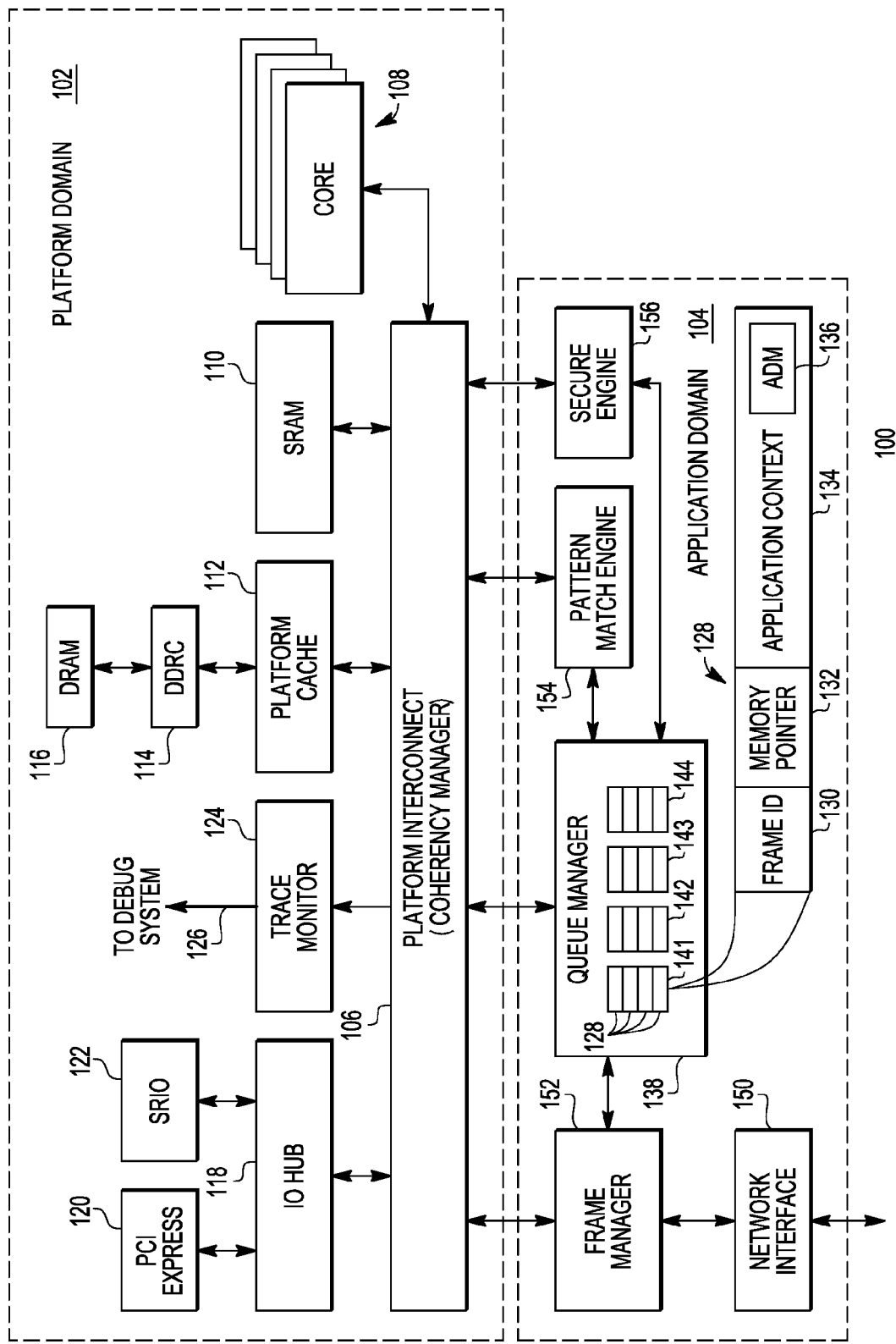
FIG. 1 is a diagram illustrating a data processing system comprising at least one address-indexed platform domain and at least one application context-oriented application domain in accordance with at least one embodiment of the present disclosure.

In accordance with one aspect of the present disclosure, a system includes a platform domain implementing address-indexed operations. The platform domain comprises a platform interconnect to process address-indexed platform transactions and a trace monitor to generate a debug trace stream from platform transactions of the platform interconnect based on platform context information of the platform transactions. The platform context information comprises at least one of an address, an attribute, or a data. The system further comprises an application domain implementing application context-oriented operations. The application domain includes a processing component coupled to the platform interconnect and a queue manager to queue descriptors for corresponding data frames to be processed by the application domain. Each descriptor comprises application context information for the corresponding data frame, the application context information including application-specific debug information. The application domain further comprises a processing component to process a selected data frame by accessing, from the queue manager, a descriptor associated with the selected data frame, translating a first application-specific debug information of the descriptor to a corresponding first platform attribute value, and providing a first platform transaction to the platform interconnect for processing in the platform domain, the first platform transaction comprising the first platform attribute value in an attribute field.

In accordance with one aspect, the trace monitor is to generate the debug trace stream by accessing the first platform attribute value of the first platform transaction via the platform interconnect, comparing the first platform attribute value with a predetermined attribute filter criterion, and providing information associated with the first platform transaction in the debug trace stream responsive to the first platform attribute value meeting the predetermined attribute filter criterion.

In accordance with one aspect, the first platform transaction is a read transaction to obtain the selected data frame from a memory of the platform domain, and the platform interconnect is to process the first platform transaction to access the selected data frame from the memory and provide the selected data from the memory to the processing component. The processing component further is to process the selected data frame to generate modified data, determine a second application-specific debug information based on the processing of the selected data frame, translate the second application-specific debug information to a corresponding second platform attribute value, and provide a second platform transaction to the platform interconnect for transmission to the memory, the second platform transaction comprising the modified data for storage at the memory and the second platform attribute value at an attribute field. The processing component also is to store the second application-specific debug information with the descriptor at the queue manager.

In accordance with another aspect, the trace monitor is to generate the debug trace stream by accessing the second platform attribute value of the second platform transaction via the platform interconnect, comparing the second platform attribute value with a predetermined attribute filter criterion, and providing information associated with the second platform transaction in the debug trace stream responsive to the second platform attribute value meeting the predetermined attribute filter criterion.

In accordance with another aspect of the present disclosure, a method is provided in a data processing system comprising a platform domain and an application domain, the platform domain comprising a platform interconnect configured to process address-indexed platform transactions and a trace monitor configured to generate a debug trace stream from platform transactions of the platform interconnect based on platform context information of the platform transactions, the platform context information comprising at least one of an address, and attribute, or data. The method includes accessing, from a queue manager of the application domain, a descriptor of a data frame processed by the processing component, the descriptor comprising application context information for the data frame, the application context information including first application-specific debug information. The method also includes translating the first application-specific debug information of the descriptor to a corresponding first platform attribute value and generating a first platform transaction comprising the first platform attribute value in an attribute field. The method further includes providing the first platform transaction to the platform interconnect for processing in the platform domain.

In accordance with another aspect, the method also includes, at the trace monitor, comparing the first platform attribute value of the first platform transaction to a predetermined attribute filter criterion and including information associated with the first platform transaction in the debug trace stream responsive to the first platform attribute value meeting the predetermined attribute filter criterion.

In accordance with another aspect, the first platform transaction is a data access transaction for the data frame and the method further comprises accessing the data frame from a memory of the platform domain responsive to receiving the platform transaction at the platform interconnect and transmitting the data frame to the processing component of the application domain via the platform interconnect. The method also includes, at the processing component of the application domain, processing the data frame to generate modified data, determining a second application-specific debug information based on the processing of the data frame, and storing the second application-specific debug information with the descriptor at the queue manager. The method further includes, at the processing component of the application domain, translating the second application-specific debug information to a corresponding second platform attribute value, generating a second platform transaction comprising the modified data and the second platform attribute value in an attribute field, and providing the second platform transaction to the platform interconnect for storage of the modified data at the memory. At the trace monitor, the method includes comparing the second platform attribute value of the second platform transaction to a predetermined attribute filter criterion and providing information associated with the second platform transaction in the debug trace stream responsive to the second platform attribute value meeting the predetermined attribute filter criterion.

In accordance with another aspect, the method also includes generating, at the queue manager, a second platform transaction responsive to determining that a number of frame descriptors for a queue available in local memory is less than a predetermined threshold, the second platform transaction including a hint value identifying data requested via the second platform transaction as representing the requested frame descriptor, accessing the requested frame descriptor from a memory of the platform domain, translating, at the memory of the platform domain, second application-specific debug information stored in the requested frame descriptor into a corresponding platform attribute value responsive to the hint value of the second platform transaction, and providing the requested frame descriptor and the second platform attribute value to the platform interconnect as a platform transaction for processing.

FIG. 1 illustrates a data processing system 100 in accordance with at least one embodiment of the present disclosure. The data processing system 100 includes at least one platform domain and at least one application domain. For ease of illustration, the depicted example includes a single platform domain 102 and a single application domain 104. The platform domain 102 comprises a platform interconnect 106 that serves as a coherency manager by acting as the medium for communications between processing components of the platform domain 102. In an alternate embodiment, a non-coherent communication mechanism can be used, such as a Message Passing Interface-based software approach. The platform interconnect 106 can include, for example, a shared bus, a point-to-point interconnect (e.g., a crossbar switch), or any combination thereof. The communications processed by the platform interconnect 106 comprise platform transactions indexed based on a memory addressing scheme or memory address space of the platform domain 102. Examples of the processing components of the platform domain 102 (referred to herein as "platform processing components") can include, for example, a plurality of processor cores 108, a static random access memory (SRAM) 110, a platform cache 112, a double data rate memory controller (DDRC) 114, a dynamic RAM (DRAM) 116, an input/output (IO) hub 118, a Peripheral Component Interconnect (PCI) express controller 120, a Serial RapidIO (SRIO) controller 122, and the like. Although FIG. 1 illustrates particular examples of processing components of the platform domain 102, it will be appreciated that the processing components of the platform domain 102 are not limited to these examples, but rather can include any of a variety of components configured to communicate information based on address-indexed transactions processed by an interconnect.

Communications of data and other information between processing components of the platform domain 102 are accomplished via platform transactions submitted for processing by the platform interconnect 106. The platform transactions can include, for example, read transactions initiated by one processing component to obtain data or other information stored or accessible by another processing component, write transactions initiated by one processing component to store data or other information at a target processing component, management transactions, and the like. For the platform domain 102, these platform transactions are indexed to a particular address based on the addressing scheme of the data processing system 100. As such, each platform transaction includes an address field to store an address value associated with the platform transaction and a data field to store any data that may be the subject of the platform transaction (e.g., write data to be stored at a target address). The platform transaction further includes a platform attribute field to store one or more platform attribute values representative of platform attributes associated with the platform transactions, such as, for example, the identifier (ID) of the requester, the transaction type (read/write/sync), transaction length, and the like.

As the platform interconnect 106 serves as the hub of communications between components of the data processing system 100, the platform interconnect 106 can be an effective point to monitor the operation of the data processing system 100 for debugging and performance characterization purposes. Accordingly, the platform domain 102 further includes a trace monitor 124 to probe or monitor platform transactions being processed by the platform interconnect 106 to identify platform transactions of interest by comparing the address or platform attributes of the platform transactions with corresponding filter criteria. The trace monitor 124 generates a trace stream 126 based on this monitoring of the platform transactions by including information contained in, or associated with, certain identified platform transactions that can be used to characterize the performance of the data processing system 100 or to debug software executed by one or more components of the data processing system 100. The configuration and operation of the trace monitor 124 is described below in greater detail with reference to FIGS. 10 and 11.

In contrast to the platform domain 102, which can be implemented to perform general processing tasks, the application domain 104 is directed to processing data for a specific application, such as a network application for initial processing of incoming and outgoing network packets or a multimedia application for the processing of multimedia data (e.g., decoding encoding video and audio). To this end, the application domain 104 includes a plurality of processing components (referred to herein as "application-specific processing components") directed to performing one or more tasks related to the application. To maximize performance, some or all of the application-specific processing components can be implemented as hardware accelerators. Alternately, an application-specific processing component can be implemented as a processor executing a corresponding software program for performing the associated tasks.

As with communications within the platform domain 102, inter-domain communications between the application domain 104 and the platform domain 102 are conducted via address-indexed platform transactions. Accordingly, the application-specific processing components of the application domain 104 are configured to interface with the platform interconnect 106 for processing platform transactions when communicating information with the platform domain 102. For communications within the application domain 104, the application-specific processing components can use the platform interconnect 106 via platform transactions or the application specific processing components can communicate directly without using the platform interconnect 106. Typically, the application-specific processing components use the platform interconnect 106 to communicate data, whereas context information or descriptors are communicated among the application-specific processing component via the queue manager 138.

Unlike the address-indexed communications within the platform domain 102, the intra-domain communications conducted by the application-specific processing components are not pre-indexed to particular addresses in the addressing scheme of the data processing device 100. Rather, the intra-domain communications are application context-oriented. To this end, the application domain 104 maintains a frame descriptor 128 for each data frame or other data unit being processed by the application domain 104. The frame descriptor 128 describes the application context about the data frame that is being processed, and therefore can include, for example, a frame identifier (ID) field 130, a memory pointer field 132, and an application context field 134. The frame ID field 130 stores a frame ID that uniquely identifies the frame descriptor and the data frame with which it is associated. The memory pointer field 132 stores a pointer to an address in a memory of the platform domain 102 that stores the associated data frame. The application context field 134 stores application context information used by application-specific processing components in performing application tasks in association with the corresponding data frame. Further, the application context information can include application context-oriented debugging information, identified herein as an application debug mark (ADM) 136.

To facilitate intra-domain communications, the application domain 104 includes, or is associated with, a queue manager 138 that stores frame descriptors 128 in one or more queues (e.g., queues 141, 142, 143, and 144). In one embodiment, each queue is associated with a particular application-specific processing component. When a data frame is initially received at the application domain 104 for processing at the application domain 104, a frame descriptor 128 is generated for the data frame and enqueued in a corresponding queue of the queue manager 138. When an application-specific processing component has completed a previous task and is ready to begin a new task, the application-specific processing component dequeues the frame descriptor 128 at the head of the corresponding queue of the queue manager 138 and performs a processing task with respect to the corresponding data frame based on the application context information of the frame descriptor 128. After completing the processing task, the application-specific processing component updates the application context information as appropriate (including updating the ADM 136) and directs the queue manager 138 to enqueue the updated frame descriptor 128 in the appropriate queue. Accordingly, the queue manager 138 manages processing flow within the application domain 104 by controlling the order and location of frame descriptors within the corresponding queues 141-144.

In one embodiment, the queue manager 138 is implemented as a hardware component within the application domain 104, such as via an application specific integrated circuit (ASIC) and a corresponding cache or register file to serve as the queues 141-144. In another embodiment, the queue manager 138 can be implemented in a memory (e.g., SRAM 110 or DRAM 116) of the platform domain 102. However, while affording greater storage capacity and thus the ability to store more frame descriptors, this remote memory implementation typically requires extensive inter-domain communication via the platform interconnect 106 and thus may impact the processing efficiency of the application domain 104.

The ADM 136 of the application context information of a frame descriptor 128 often is useful for debugging the application domain 104 or for characterizing the performance of the application domain 140. To illustrate, the ADM 136 can include a value used to characterize the throughput of a particular network flow through the system or to characterize the latency of a particular network packet through each step of the packet processing in the application domain 104. As noted above, the trace monitor 124 identifies platform transactions for inclusion in the trace stream 126 based on a comparison of one or both of the address or platform attribute of the platform transaction with corresponding filter criteria, whereas the ADM 136 is application context-oriented meta data and thus is not address information or platform attribute information. Accordingly, a platform transaction that included a frame descriptor 128 in the data field without adaptation of the ADM 136 of the frame descriptor would view the ADM 136 merely as data. Therefore, it is hard for the platform interconnect 106 and the trace monitor 124 to differentiate context associated with the platform transaction without knowledge of the ADM 136 from the application domain 104.

To facilitate inclusion of the ADM 136 in the trace stream 126 as appropriate, when an application-specific processing component of the application domain 104 is generating a platform transaction for communicating with the platform domain 102 with respect to a corresponding data packet, the application-specific processing component is configured to translate the ADM 136 of the frame descriptor 128 associated with the data packet into a corresponding transaction data mark (TDM) and include the TDM in the platform attribute field of the platform transaction. As described in greater detail below, the translation of an ADM to a corresponding TDM can be accomplished by a hardwired or programmable look-up table, by logic and other circuitry configured to translate a particular ADM to the corresponding TMD, and the like.

As the TDM is formatted as a platform attribute value and stored in the platform attribute field of the platform transaction, the platform interconnect 106 and the trace monitor 124 view the TDM as a platform attribute value and process the TDM accordingly. As such, the filter criteria for the trace monitor 124 can be set so as to trigger the trace monitor 124 to identify the platform transaction as a transaction of interest for inclusion in the trace stream 126 based on the TDM in the platform attribute field of the platform transaction. By translating the ADM to a TDM and including the TDM in the platform attribute field of a corresponding platform transaction, the application-specific processing components 104 can ensure the inclusion of certain debug information or performance information specific to the application domain 104 is visible to the trace monitor 124 of the platform domain 102.

In the example of FIG. 1, the application domain 104 is a network processing domain directed to the initial processing incoming data packets received from a network (e.g., a wireless network, an Ethernet network, etc.) and the final processing of outgoing data packets to be provided to the network for transmission to other devices. In this example, the application-specific processing components of the application domain 104 include a network interface 150, a frame manager 152, a pattern match engine 154, and a secure engine 156. The network interface 150 is connected to a network, such as an Ethernet network or a wireless network. The frame manager 152 is configured to perform the initial processing of data packets received from the network and to perform the final processing of data packets to be provided to the network, whereby the data packets (or certain fields thereof) are the data frames in this example. The initial processing of a data frame can include, for example, classifying the data frame, identifying the corresponding application data flow that the data frame is associated with, and the like. Further, the frame manager 152 can generate a new frame descriptor 128 for the incoming data frame and enqueue the frame descriptor 128 at the queue manager 138. Further, the frame manager 152 could direct the queue manager 138 to delete the corresponding frame descriptor 128 as the data packet is no longer present at the data processing system 100. The pattern match engine 154 and the secure engine 156 illustrate hardware accelerators configured to perform application-specific tasks with respect to data packets processed by the application domain 104. The pattern match engine 154 inspects and examines the network packet data for pre-defined patterns and triggers certain processing operations based on identified matches. The secure engine 156 performs cryptographic algorithm acceleration on network packets.

As described in greater detail herein, the frame descriptor 152, the pattern match engine 154, and the secure engine 156 use the frame descriptors 128 stored by the queue manager 138 to perform specified tasks with respect to the corresponding data packets and modify the frame descriptors 128 to reflect the performance of the specified tasks and to communicate certain information about the processing of the data packets. Further, when preparing a platform transaction for communication of information regarding a particular data packet with the platform domain, these application-specific processing components access the ADM 136 of a frame descriptor 128 of a particular data packet and translate the ADM 136 to a corresponding TDM for inclusion in the platform attribute field of the platform transaction so as to ensure that the platform transaction is correctly considered by the trace monitor 124 for inclusion in the trace stream 126.

Figure 3:
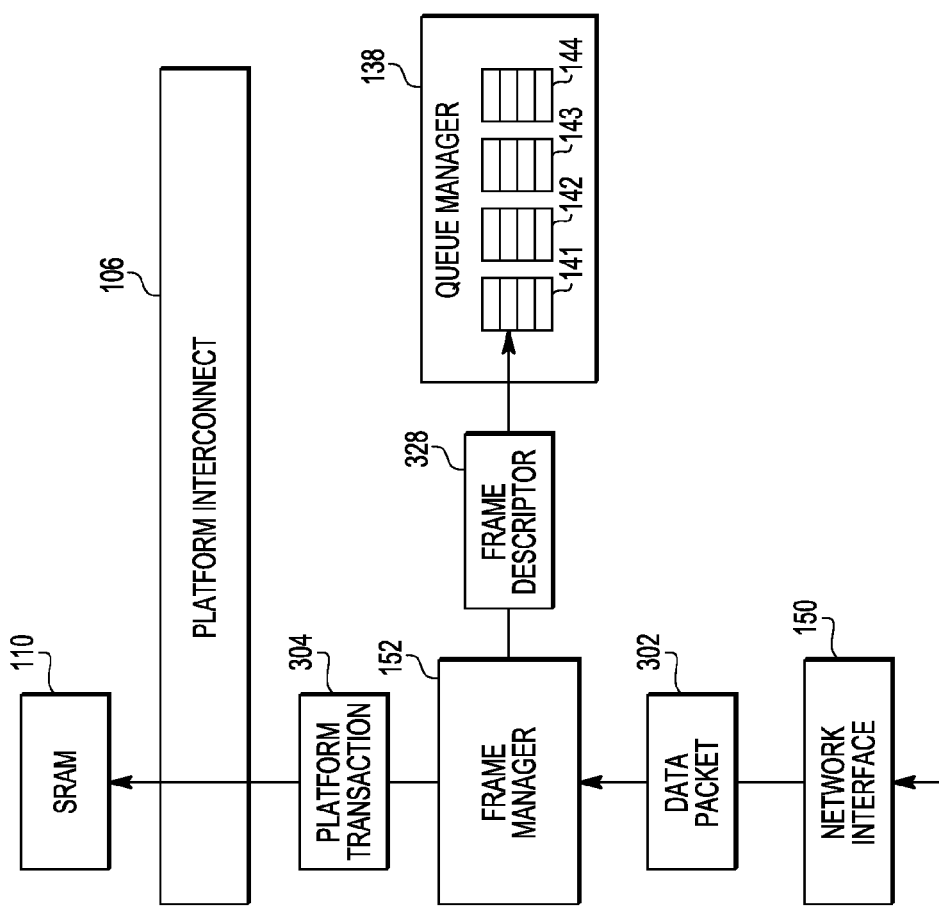
FIG. 3 is a diagram illustrating an example operation of the method of FIG. 2 in the data processing system of FIG. 1 in accordance with at least one embodiment of the present disclosure.
Figure 2:
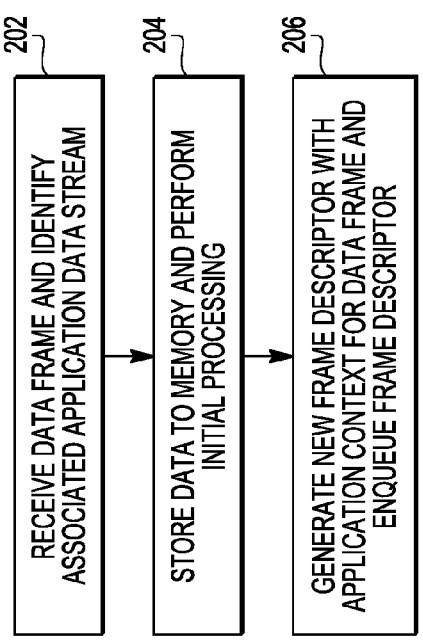
FIG. 2 is a flow diagram illustrating an example method of generating a new descriptor for an incoming data packet to the data processing system of FIG. 1 in accordance with at least one embodiment of the present disclosure.

FIG. 2 illustrates an example method 200 for initial processing of a data frame in the application domain 104 of the data processing system 100 of FIG. 1 and FIG. 3 illustrates an example operation 300 of the method 200 in accordance with at least one embodiment of the present disclosure. At block 202, the application domain 104 receives a data frame and the data frame is initially analyzed to identify the application data flow with which the data frame is associated. In the example operation 300, the network interface 150 receives a data packet 302 (an example of a data frame) and provides the data packet 302 to the frame manager 152 for initial analysis and classification. In this example, the frame manager 152 identifies the data packet 302 as being associated with the application data flow for queue 141.

At block 204, the application domain 104 generates a platform transaction to write the data frame to a memory of the platform domain 102. In the example operation 300, the frame manager 152 generates a platform transaction 304 that includes the data packet 302 and provides the platform transaction 304 to the platform interconnect 106 for processing. In response, the platform interconnect 106 writes the data packet 302 to the SRAM 110.

At block 206, the application domain 104 generates a new frame descriptor for the data frame and enqueues the new frame descriptor at the queue manager 138. The new frame descriptor can include initial application context information and other information associated with the data frame. In the example operation 300, the frame manager 152 generates a frame descriptor 328 that includes an initial default ADM and includes the address returned from the platform interconnect 106 and then provides the frame descriptor 328 to be enqueued in the queue 141.

Figure 5:
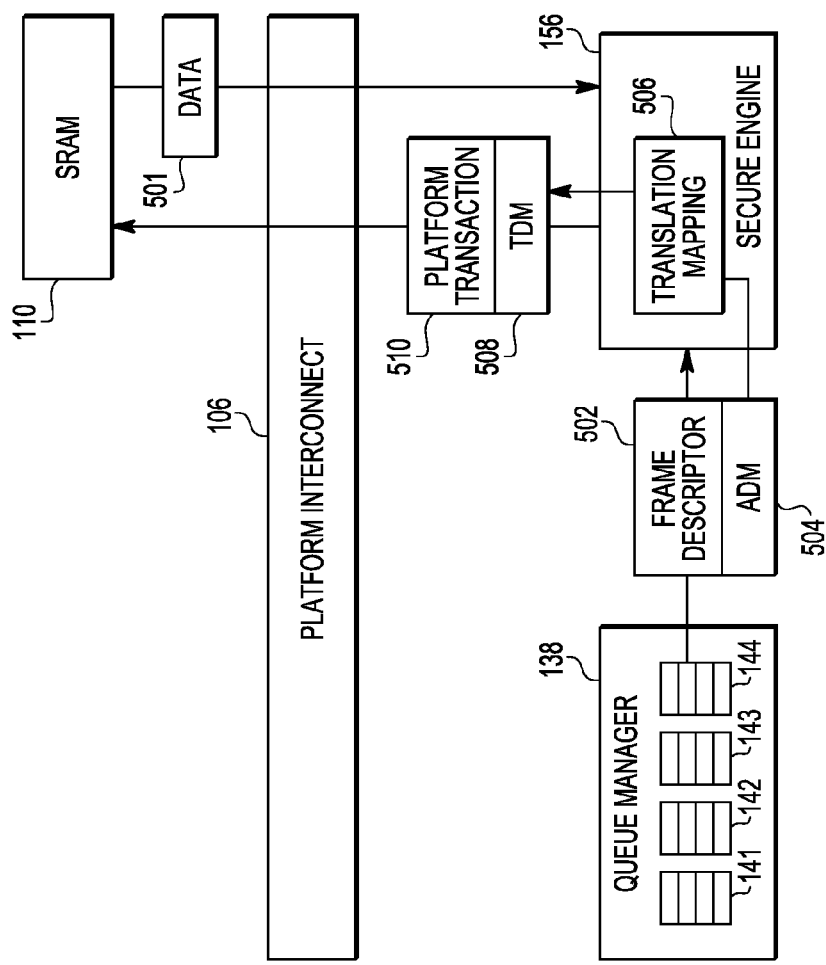
FIG. 5 is a diagram illustrating an example operation of the method of FIG. 4 in the data processing system of FIG. 1 in accordance with at least one embodiment of the present disclosure.
Figure 4:
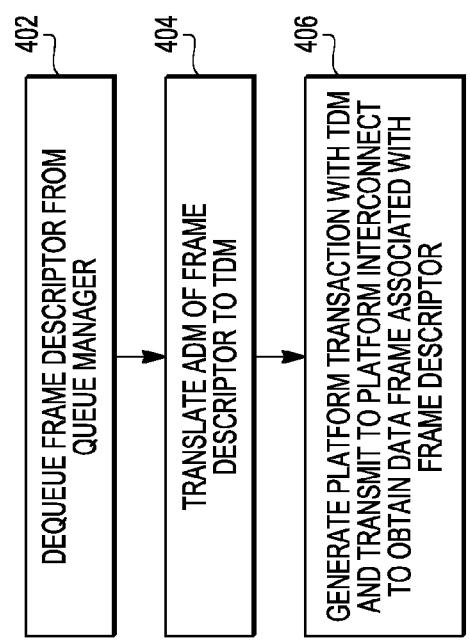
FIG. 4 is a flow diagram illustrating an example method of generating a platform transaction to obtain a data frame for an application-specific component of an application domain of the data processing system of FIG. 1 in accordance with at least one embodiment of the present disclosure.

FIG. 4 illustrates an example method 400 for obtaining a data frame from the platform domain 102 for processing in the application domain 104 of the data processing system 100 of FIG. 1 and FIG. 5 illustrates an example operation 500 of the method 400 in accordance with at least one embodiment of the present disclosure. At block 402, an application-specific processing component of the application domain 104 initiates processing of a data frame by dequeueing the corresponding frame descriptor from the corresponding queue of the queue manager 138. In the example operation 500, the secure engine 156 initiates processing of a data packet 501 (one embodiment of a data frame) by dequeueing a frame descriptor 502 associated with the data packet 501 from the queue 144 of the queue manager 138. The frame descriptor 502 includes a memory address field that stores a memory address or pointer to the location of SRAM 110 that stores the data packet 501 and an application context field that stores the application context information for the data packet, including an ADM 504.

At block 404, the application-specific processing component uses a translation mapping module to translate the ADM of the dequeued frame descriptor to a corresponding TDM that will be recognized by the trace monitor 124. In the example operation 500, the secure engine 506 includes a translation mapping module 506 that translates the ADM 504 to a TDM 508. The translation mapping module 506 can include a hardcoded look-up table, a programmable look-up table, circuitry that performs a specified set of logic operations on the ADM 504 to generate the resulting TDM 508, and the like.

At block 406, the application-specific processing component generates a platform transaction for a read operation so as to obtain the data frame from the memory location specified by the memory address or pointer in the corresponding frame descriptor. Further, the application-specific processing component includes the translated TDM in the platform attribute field of the platform transaction for consideration by the trace monitor 124 while the platform transaction is being processed by the platform interconnect 106. The platform connect 106 then processes the platform transaction to read the data frame (or portion thereof) from the memory location of the platform domain 102 and provides the data frame to the application-specific processing component for subsequent processing. In the example operation 500, the secure engine 156 includes the TDM 508 in a platform transaction 510 that represents a read operation for the data packet 501. The platform interconnect 106 processes the platform transaction 510 to read the data packet 501 from the SRAM 110 and provides the data packet 501 to the secure engine 156 for processing as appropriate.

Figure 7:
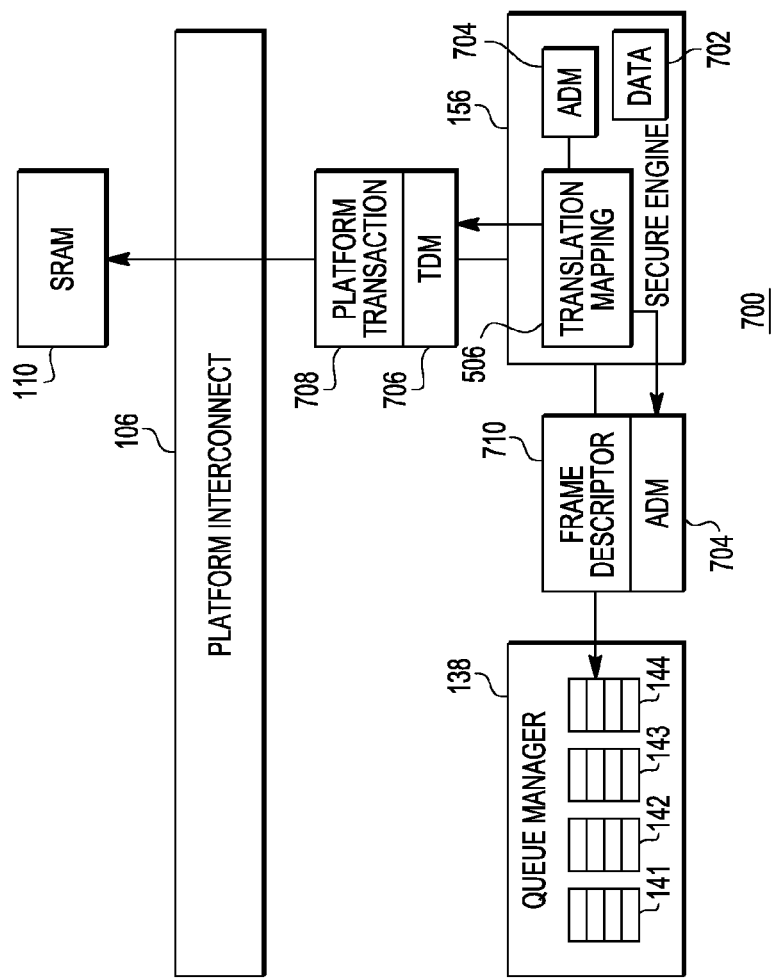
FIG. 7 is a diagram illustrating an example operation of the method of FIG. 6 in the data processing system of FIG. 1 in accordance with at least one embodiment of the present disclosure.
Figure 6:
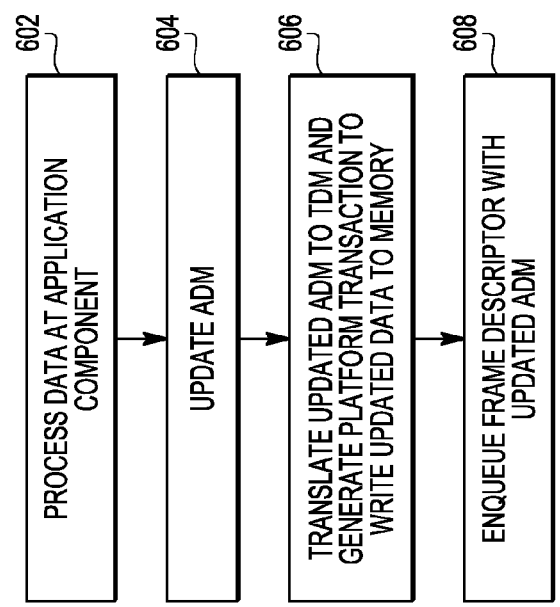
FIG. 6 is a flow diagram illustrating an example method of generating a platform transaction for a data packet responsive to processing the data packet by an application-specific component of an application domain of the data processing system of FIG. 1 in accordance with at least one embodiment of the present disclosure.

FIG. 6 illustrates an example method 600 for updating a frame descriptor to reflect processing of the corresponding data frame by the application domain 104 of the data processing system 100 of FIG. 1 and FIG. 7 illustrates an example operation 700 of the method 600 in accordance with at least one embodiment of the present disclosure. Prior to block 602, an application-specific processing component has dequeued a frame descriptor associated with a data frame and obtained the data frame as described above. At block 602, the application-specific processing component processes the data frame. In the example operation 700, the secure engine 156 processes a data packet 702 (e.g., decrypted a payload of the data packet 702).

The processing of the data frame may result in changes to the application context information in the corresponding frame descriptor to reflect the processing of the data or the results of the processing. In particular, the ADM of the application context information may need to be updated. Accordingly, at block 604 the application-specific processing component updates the ADM of the frame descriptor to reflect the processing performed. In the example operation 700, the secure engine 156 updates the original ADM (not shown) to generate an updated ADM 704 that reflects the processing performed by the secure engine 156 on the data packet 702.

The processing of the data frame may result in updated frame data that will need to be written back to the memory of the platform domain 102. Moreover, the application domain 104 may need to provide the updated ADM to the platform domain 102 for consideration for inclusion in the trace stream 126. Accordingly, at block 606, the application-specific processing component translates the updated ADM to a corresponding TDM and provides a platform transaction including the updated data and the TDM to the platform interconnect 106 for processing as a write operation. Moreover, the trace monitor 124 can probe the TDM of the platform interconnect 106 to determine whether information of the platform transaction should be included in the trace stream 126. In the example operation 700, the translation mapping module 506 of the secure engine 156 translates the updated ADM 704 to a corresponding TDM 706 and generates a platform transaction 708 that includes the TDM 706 and any updated data resulting from the processing performed by the secure engine 156. The platform interconnect 106 then processes the platform transaction 708 to write the updated data to the corresponding location of the SRAM 110. The trace monitor 124 further can probe the platform transaction 708 using the TDM 706 as a trigger for including the TDM 706 in the trace stream 126.

At block 608, the application-specific processing component updates the application context information of frame descriptor to reflect the processing performed by the secure engine 156 by including the updated ADM in the frame descriptor and then enqueues the updated frame descriptor back into the queue manager 138 for use by another component of the application domain 104. In the example operation 700, the secure engine 156 updates the accessed frame descriptor 710 by replacing the ADM with the updated ADM 704 and then enqueueing the frame descriptor 710 in the queue 144 of the queue manager 138.

Figure 9:
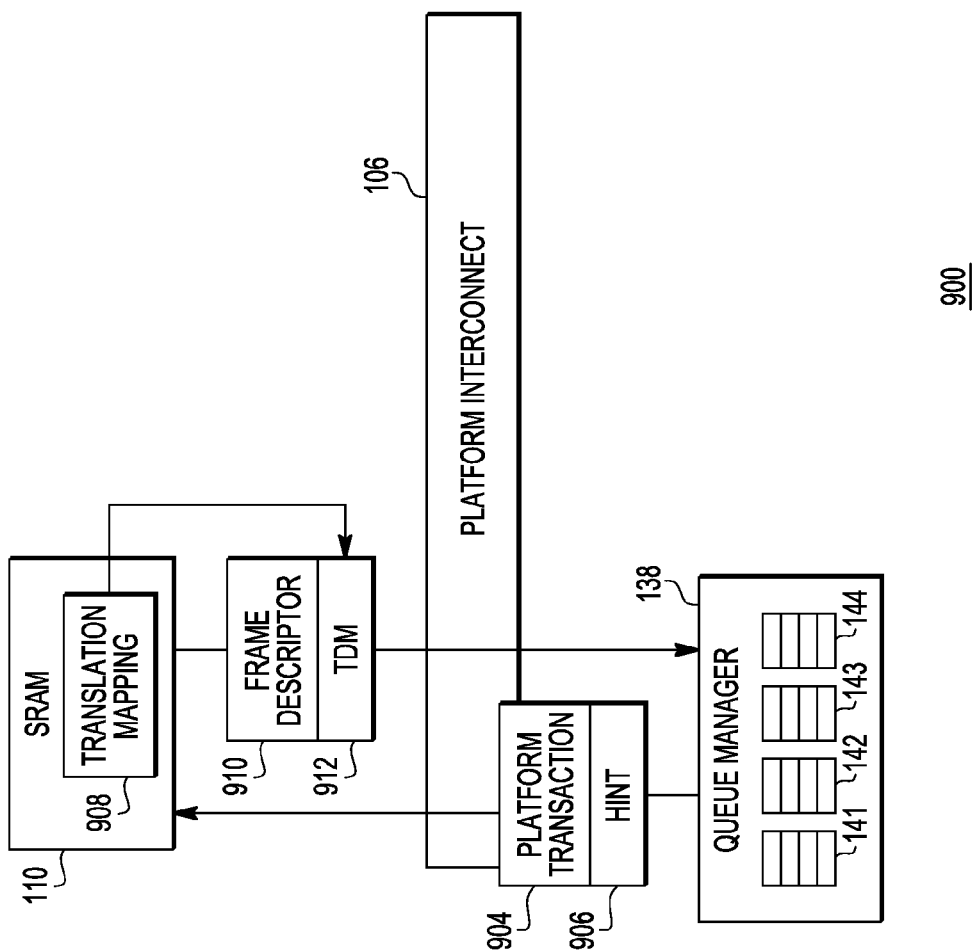
FIG. 9 is a diagram illustrating an example operation of the method of FIG. 8 in the data processing system of FIG. 1 in accordance with at least one embodiment of the present disclosure.
Figure 8:
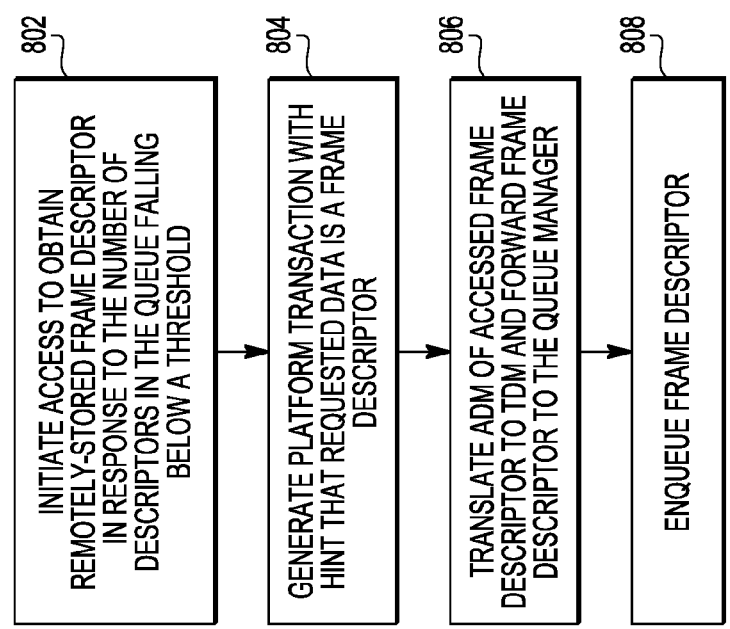
FIG. 8 is a flow diagram illustrating an example method of generating a platform transaction to obtain a frame descriptor remotely stored in the platform domain of the data processing system of FIG. 1 in accordance with at least one embodiment of the present disclosure.

In certain instances, the frame descriptor may not be locally stored by the queue manager 138. The queue manager 138 may have a limited amount of storage capacity, and thus updated frame descriptors to be enqueued at the tail of a queue (assuming a first-in, first-out (FIFO) structure) may have to be remotely stored at a memory of the platform domain 102 rather than locally in the application domain 104. In such instances, once there is space in the queue, the queue manager 138 may then access the remote memory to enqueue the remotely-stored frame descriptor. FIG. 8 illustrates an example method 800 for accessing a remotely-stored frame descriptor and FIG. 9 illustrates an example operation 900 of the method 800 in accordance with at least one embodiment of the present disclosure. At block 802, the queue manager 138 determines that the number of frame descriptors available in local memory have fallen below a predetermined threshold, and in response, initiates an access operation to a remote memory of the platform domain 102 (e.g., SRAM 110) to obtain the next frame descriptor stored at the remote memory and enqueue the accessed frame descriptor in the identified queue managed by the queue manager 138. In the example operation 900, the queue manager 138 determines that the number of frame descriptors available in local memory have fallen below a specified threshold and therefore initiates an access operation to obtain a frame descriptor for the queue 141 from the SRAM 110. Accordingly, at block 804 the queue manager 138 generates a platform transaction for a read operation to obtain the requested frame descriptor from the memory of the platform domain 102. However, because the frame descriptor is not locally stored, the queue manager 138 does not have the ADM for the frame descriptor and therefore the queue manager 138 cannot include a corresponding TDM translated from the ADM in the platform attribute field of the platform transaction for consideration by the trace monitor 124. Instead, the queue manager 138 stores a hint value in the platform attribute field of the platform transaction, whereby the hint value serves to indicate that the data requested includes a frame descriptor. In the example operation 900, the queue manager 138 generates a platform transaction 904 that includes a hint value 906 in the platform attribute field or other field of the platform transaction 904. The platform interconnect 106 processes the platform transaction 904 to read the data representative of the frame descriptor from the SRAM 110.

In response to the platform transaction including the hint value, at block 806 the target memory (or component associated with the target memory) accesses the requested data representative of the frame descriptor, identifies the ADM of the frame descriptor and translates the ADM to a corresponding TDM, and then forwards the frame descriptor and the corresponding TDM back to the queue manager 138 via a platform transaction having the corresponding TDM in the platform attribute field (with the original ADM maintained in the frame descriptor). As such, the trace monitor 124 can consider the platform transaction for inclusion in the trace stream 126 on the basis of the TDM in the platform attribute field. In the example operation 900, a memory controller (not shown) of the SRAM 110 includes a translation mapping module 908 that translates an ADM of the stored frame descriptor 910 to a corresponding TDM 912 and forwards the frame descriptor 910 with the corresponding TDM 912 to the queue manager 138.

At block 808, the queue manager 138 receives and enqueues the frame descriptor. In the example operation 900, the queue manager 138 receives the frame descriptor 910, and enqueues the frame descriptor 910 with the embedded ADM into the queue 141. In the event that the queues are arranged as FIFOs, the frame descriptor 910 is enqueued at the tail of the queue 141.

Figure 11:
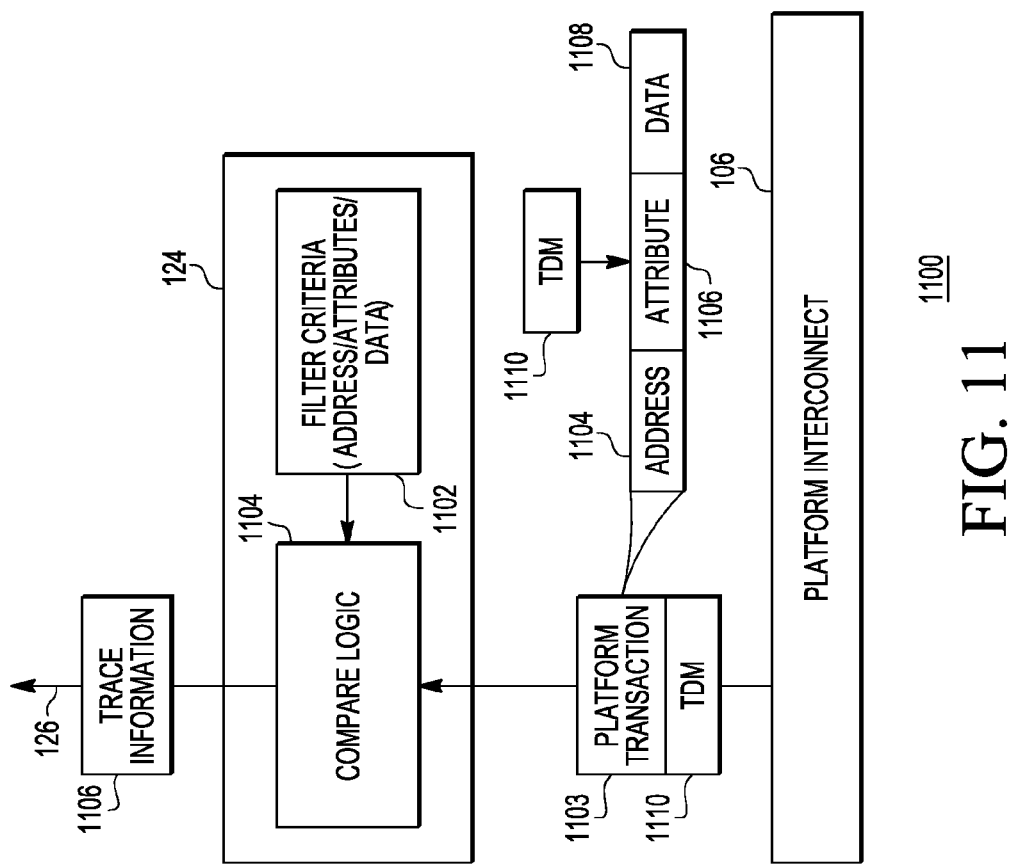
FIG. 11 is a diagram illustrating an example operation of the method of FIG. 10 in the data processing system of FIG. 1 in accordance with at least one embodiment of the present disclosure.
Figure 10:
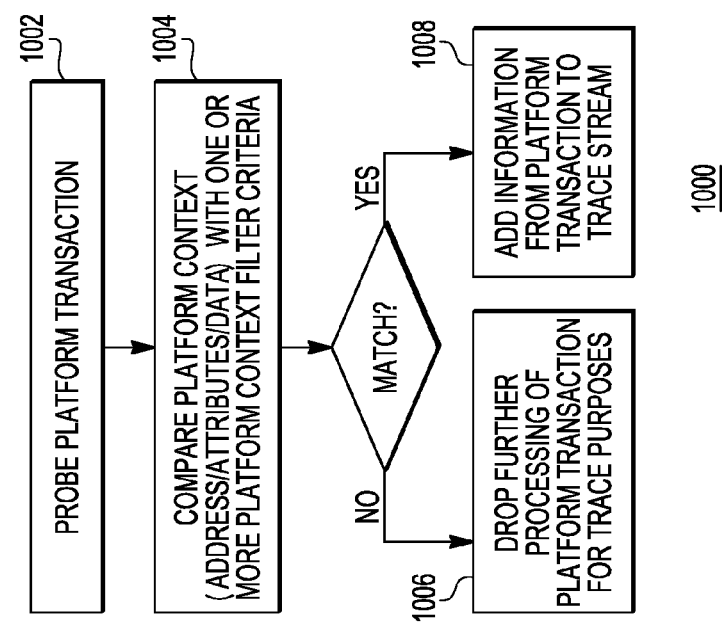
FIG. 10 is a flow diagram illustrating an example method of probing or monitoring platform transactions to generate a trace stream for debugging and performance characterization for the data processing system of FIG. 1 in accordance with at least one embodiment of the present disclosure.

FIG. 10 illustrates an example method 1000 for filtering platform transactions by the trace monitor 124 of the data processing system 100 of FIG. 1 and FIG. 11 illustrates an example operation 1100 of the method 1000 of FIG. 10 in accordance with at least one embodiment of the present disclosure. As illustrated by the example operation 1100, the trace monitor 124 includes a data store 1102 (e.g., a register file) to store one or more filter criteria used to identify platform transactions of interest. The filter criteria can include criteria directed to platform context rather than application context, such as, for example, specific addresses or specific address ranges, specific platform attribute values or specific platform attribute value ranges, and the like. The filter criteria may be hardcoded or programmable. The trace monitor 124 further includes compare logic 1104 configured to compare the values stored in one or more fields of a platform transaction being probed with the filter criteria represented in the data store 1102. In the event of a match between the value of a field of the platform transaction and a corresponding criterion, the compare logic 1104 is configured to extract information from one or more fields of the platform transaction and include the extracted information as trace information 1106 in the trace stream 126.

Method 1000 illustrates this filtering operation. At block 1002, a platform transaction is received at the platform interconnect 106 and, in response, the trace monitor 124 begins to monitor the platform transaction. In the example operation 1100, a platform transaction 1103 generated by the application domain 104 is processed at the platform interconnect 106 and thus probed by the trace monitor 124. As illustrated, the platform transaction 1103 includes an address field 1104, a platform attribute field 1106, and a data field 1108. Because this platform transaction 1103 is from the application domain 104, the platform attribute field 1106 includes a TDM 1110 translated from the ADM of a corresponding field descriptor associated with the processing that resulted in the generation of the platform transaction 1103.

At block 1004, the compare logic 1104 of the trace monitor 124 compares the platform context information of the platform transaction (e.g., values of the address field 1104 or values of the platform attribute field 1106) with at least one platform context-based filter criterion of the data store 1102. In the example operation 1100, the compare logic 1104 extracts the TDM 1110 stored in the platform attribute field 1106 and treats the TDM 1110 as though it were a conventional platform attribute by comparing the TDM 1110 with one or more filter criteria configured for platform attributes.

In the event there is no match between the platform context fields of the platform transaction and the filter criteria, at block 1006 the trace monitor 124 ceases processing of the platform transaction for trace purposes. Otherwise if there is a match, at block 1008 the trace monitor 124 extracts data from one or more of the fields of the platform transaction and includes the extracted data as the trace information 1106 in the trace stream 126. In the example operation 1100, the TDM 1110 matches a platform attribute filter criterion and thus the TDM 1110 is included as trace information 1106 in the trace stream 126.

The term "another", as used herein, is defined as at least a second or more. The terms "including", "having", or any variation thereof, as used herein, are defined as comprising. Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A system comprising:
   a platform domain implementing address-indexed operations, the platform domain comprising:
   a platform interconnect to process address-indexed platform transactions; and
   a trace monitor to generate a debug trace stream from platform transactions of the platform interconnect based on platform context information of the platform transactions, the platform context information comprising at least one of an address, an attribute, or a data; and
   an application domain implementing application context-oriented operations, the application domain comprising:
   a processing component coupled to the platform interconnect; and
   a queue manager to queue descriptors for corresponding data frames to be processed by the application domain, each descriptor comprising application context information for the corresponding data frame, the application context information including application-specific debug information; and the processing component to process a selected data frame by:
accessing, from the queue manager, a descriptor associated with the selected data frame;
translating a first application-specific debug information of the descriptor to a corresponding first platform attribute value; and
providing a first platform transaction to the platform interconnect for processing in the platform domain, the first platform transaction comprising the first platform attribute value in an attribute field.

2. The system of claim 1, wherein the trace monitor is to generate the debug trace stream by:
accessing the first platform attribute value of the first platform transaction via the platform interconnect;
comparing the first platform attribute value with a predetermined attribute filter criterion; and
providing information associated with the first platform transaction in the debug trace stream responsive to the first platform attribute value meeting the predetermined attribute filter criterion.

3. The system of claim 1, wherein the first platform transaction is a read transaction to obtain the selected data frame from a memory of the platform domain, and wherein the platform interconnect is to process the first platform transaction to access the selected data frame from the memory and provide the selected data from the memory to the processing component.

4. The system of claim 3, wherein the processing component further is to:
process the selected data frame to generate modified data;
determine a second application-specific debug information based on the processing of the selected data frame;
translate the second application-specific debug information to a corresponding second platform attribute value; and
provide a second platform transaction to the platform interconnect for transmission to the memory, the second platform transaction comprising the modified data for storage at the memory and the second platform attribute value at an attribute field.

5. The system of claim 4, wherein the processing component further is to:
store the second application-specific debug information with the descriptor at the queue manager.

6. The system of claim 3, wherein the trace monitor is to generate the debug trace stream by:
accessing the second platform attribute value of the second platform transaction via the platform interconnect;
comparing the second platform attribute value with a predetermined attribute filter criterion; and
providing information associated with the second platform transaction in the debug trace stream responsive to the second platform attribute value meeting the predetermined attribute filter criterion.

7. The system of claim 1, wherein the processing component comprises a hardware accelerator.

8. The system of claim 1, wherein the application domain comprises a network processing domain.

9. The system of claim 1, wherein the application domain comprises a multimedia processing domain.

10. In a data processing system comprising a platform domain and an application domain, the platform domain comprising a platform interconnect configured to process address-indexed platform transactions and a trace monitor configured to generate a debug trace stream from platform transactions of the platform interconnect based on platform context information of the platform transactions, the platform context information comprising at least one of an address, and attribute, or data, a method comprising:
at a processing component of the application domain:
accessing, from a queue manager of the application domain, a descriptor of a data frame processed by the processing component, the descriptor comprising application context information for the data frame, the application context information including first application-specific debug information;
translating the first application-specific debug information of the descriptor to a corresponding first platform attribute value;
generating a first platform transaction comprising the first platform attribute value in an attribute field; and
providing the first platform transaction to the platform interconnect for processing in the platform domain.

11. The method of claim 10, further comprising:
at the trace monitor:
comparing the first platform attribute value of the first platform transaction to a predetermined attribute filter criterion; and
including information associated with the first platform transaction in the debug trace stream responsive to the first platform attribute value meeting the predetermined attribute filter criterion.

12. The method of claim 10, wherein the first platform transaction is a data access transaction for the data frame, the method further comprising:
accessing the data frame from a memory of the platform domain responsive to receiving the platform transaction at the platform interconnect;
transmitting the data frame to the processing component of the application domain via the platform interconnect.

13. The method of claim 12, further comprising:
at the processing component of the application domain:
processing the data frame to generate modified data;
determining a second application-specific debug information based on the processing of the data frame;
storing the second application-specific debug information with the descriptor at the queue manager.

14. The method of claim 13, further comprising:
at the processing component of the application domain:
translating the second application-specific debug information to a corresponding second platform attribute value;
generating a second platform transaction comprising the modified data and the second platform attribute value in an attribute field; and
providing the second platform transaction to the platform interconnect for storage of the modified data at the memory.

15. The method of claim 14, further comprising:
at the trace monitor:
comparing the second platform attribute value of the second platform transaction to a predetermined attribute filter criterion; and
providing information associated with the second platform transaction in the debug trace stream responsive to the second platform attribute value meeting the predetermined attribute filter criterion.

16. The method of claim 10, further comprising:
receiving, at the application domain, the data frame from a component external to the application domain; and generating the descriptor and storing the descriptor at the queue manager responsive to receiving the data frame at the application domain.

17. The method of claim 10, wherein the processing component of the application domain comprises a hardware accelerator.

18. The method of claim 10, wherein the application domain comprises a network processing domain.

19. The method of claim 10, wherein the application domain comprises a multimedia processing domain.

20. The method of claim 10, further comprising:
generating, at the queue manager, a second platform transaction responsive to determining that a number of frame descriptors for a queue available in local memory is less than a predetermined threshold, the second platform transaction including a hint value identifying data requested via the second platform transaction as representing the requested frame descriptor;
accessing the requested frame descriptor from a memory of the platform domain;
translating, at the memory of the platform domain, second application-specific debug information stored in the requested frame descriptor into a corresponding platform attribute value responsive to the hint value of the second platform transaction; and
providing the requested frame descriptor and the second platform attribute value to the platform interconnect as a platform transaction for processing.

* * * * *